(12) United States Patent
Atkins

(10) Patent No.: US 8,746,894 B2
(45) Date of Patent: Jun. 10, 2014

(54) 3D DISPLAY SYSTEM

(75) Inventor: Robin A. Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 240 days.

(21) Appl. No.: 13/391,978

(22) PCT Filed: Aug. 23, 2010

(86) PCT No.: PCT/US2010/046297
§ 371 (c)(1),
(2), (4) Date: Feb. 23, 2012

(87) PCT Pub. No.: WO2011/025727
PCT Pub. Date: Mar. 3, 2011

(65) Prior Publication Data
US 2012/0154396 A1    Jun. 21, 2012

Related U.S. Application Data

(60) Provisional application No. 61/236,796, filed on Aug. 25, 2009.

(51) Int. Cl.
*G03B 21/14*    (2006.01)
*H04N 13/04*    (2006.01)
*G02B 27/22*    (2006.01)

(52) U.S. Cl.
CPC ....... *H04N 13/0447* (2013.01); *H04N 13/0459* (2013.01); *G02B 27/2214* (2013.01); *G02B 27/225* (2013.01)
USPC ............... 353/77; 352/61; 359/459; 359/471; 353/10; 353/79

(58) Field of Classification Search
USPC ................ 353/7, 10; 359/458, 459, 471, 479; 348/42, 51, 54, 59; 352/61
See application file for complete search history.

(56) References Cited

U.S. PATENT DOCUMENTS

| | | | |
|---|---|---|---|
| 1,883,291 A | 10/1932 | Ives | |
| 4,526,439 A * | 7/1985 | Okoshi et al. | 359/458 |
| 5,617,334 A | 4/1997 | Tseng | |
| 6,055,012 A | 4/2000 | Haskell | |
| 6,081,380 A | 6/2000 | Ohshima | |
| 6,344,926 B1 | 2/2002 | Arimoto | |

(Continued)

FOREIGN PATENT DOCUMENTS

| | | |
|---|---|---|
| CN | 101461251 | 6/2009 |
| DE | 10123933 | 11/2002 |

(Continued)

OTHER PUBLICATIONS

Ferris, Steven H., "Motion Parallax and Absolute Distance" Journal of Experimental Psychology, vol. 95(2), Oct. 1972 258-263.

(Continued)

*Primary Examiner* — William C Dowling
(74) *Attorney, Agent, or Firm* — Tyrome Brown

(57) ABSTRACT

Methods and systems for displaying three-dimensional (3D) images using motion parallax are described. Images are projected onto a reflector with a rippled or faceted surface. The reflected images are viewed at a plurality of viewing locations and a different image is perceived according to the viewing location.

24 Claims, 13 Drawing Sheets

(56) References Cited

U.S. PATENT DOCUMENTS

| | | | |
|---|---|---|---|
| 6,437,917 B1 * | 8/2002 | Ooshima et al. | 359/599 |
| 6,600,600 B2 | 7/2003 | Chen | |
| 6,795,241 B1 * | 9/2004 | Holzbach | 359/463 |
| 7,035,453 B2 | 4/2006 | Liu | |
| 7,453,637 B2 * | 11/2008 | Taira et al. | 359/455 |
| 7,948,678 B1 * | 5/2011 | Poulsen | 359/454 |
| 8,264,772 B2 * | 9/2012 | Javidi et al. | 359/462 |
| 8,459,797 B2 * | 6/2013 | Kuo et al. | 353/7 |
| 2006/0012542 A1 | 1/2006 | Alden | |
| 2006/0109202 A1 * | 5/2006 | Alden | 345/32 |
| 2007/0041094 A1 * | 2/2007 | Dominguez-Montes | 359/462 |
| 2010/0188746 A1 | 7/2010 | Coleman | |
| 2010/0259818 A1 * | 10/2010 | Mikoshiba | 359/459 |

FOREIGN PATENT DOCUMENTS

| | | |
|---|---|---|
| EP | 0493863 | 7/1992 |
| EP | 1378783 | 1/2004 |
| GB | 787237 | 12/1957 |
| JP | 2008-003172 | 1/2008 |
| WO | 02076093 | 9/2002 |
| WO | 03050611 | 6/2003 |
| WO | 2008/070246 | 6/2008 |

OTHER PUBLICATIONS

Boerner R., "Autostereoscopic 3D-Imaging by Front and Rear Projection and on Flat Panel Displays" DEMPA Publications, Tokyo, vol. 14, No. 1, Jan. 1, 1993, pp. 39-46.

* cited by examiner

1810

3D DISPLAY SYSTEM

CROSS-REFERENCE TO RELATED APPLICATIONS

This application claims priority to U.S. Provisional Patent Application No. 61/236,796 filed 25 Aug. 2009, hereby incorporated by reference in its entirety.

FIELD

The present disclosure relates to three-dimensional (3D) capture and/or display systems and methods. In particular, it relates to 3D display and/or capture using motion parallax techniques.

BACKGROUND

Motion parallax is typically a term for a perceived 3D effect which comes from having a different perspective of a scene dependent on viewing position. For example, when moving the head from side to side, the scene should be perceived differently due to the different relationships between objects. Also incorporated in this concept are other 3D cues such as lighting, shadows, binocular vision and perspective. The human visual system uses a combination of 3D cues to fully construct and perceive a 3D image.

Motion parallax provides a different image to the viewer depending on the perspective of the viewer. This is more complex than stereo vision because it is up to the viewer to determine his or her perspective, by moving around. In particular, when an observer moves, the apparent relative motion of several stationery objects against a background gives hints about a relative distance. If information about the direction and velocity of movement is known, motion parallax can provide absolute depth information. See, for example, Ferris, S. H. (1972): Motion Parallax and Absolute Distance, Journal of Experimental Psychology, 95(2), 258-263. Some methods to implement motion parallax have tracked the position of the viewer to determine the correct view for the viewer's perspective. However, these methods do not work well or at all for multiple viewers, and can exhibit latency even for a single viewer due to delays in motion tracking.

A second technique is to simultaneously show different images which appear only at the appropriate perspective—termed multi-view. Phillips® and other manufacturers have manufactured LCD displays to achieve this effect, using lenticular arrays over an LCD to direct light from certain pixels into the desired orientation. This is achieved by sacrificing image resolution—i.e., for 10 views in the horizontal direction, 10 vertical pixels for each image pixel are needed, thus degrading the horizontal resolution of the image by a factor of 10.

SUMMARY

Methods and systems for displaying three-dimensional (3D) images using motion parallax are described. Images are projected onto a reflector with a rippled or faceted surface. The reflected images are viewed at a plurality of viewing locations and a different image is perceived according to the viewing location.

According to an embodiment of the present disclosure, a system for three-dimensional (3D) display of images using motion parallax is provided, comprising: at least one specular reflector having a rippled or faceted surface; at least one projector adapted to project images onto the rippled or faceted surface of the at least one specular reflector; and a plurality of viewing locations, each viewing location adapted to perceive images projected from the at least one projector and reflected by the rippled or faceted surface of the at least one specular reflector,
wherein: the images perceived by the viewing locations differ in accordance with an angle formed by the rippled or faceted surface when reflecting an image to a viewing location, each viewing location corresponds to a viewpoint of the image, and the number of the viewpoints of the image and the angular density of the viewpoints of the image are configured to provide a smooth transition between adjacent viewpoints of the image.

According to another embodiment of the present disclosure, a method for displaying three-dimensional (3D) images using motion parallax is provided, comprising: projecting images onto a rippled or faceted surface of at least one specular reflector, wherein adjacent pixels of the reflected images are reflected at different angles to different viewing locations depending on the angle of the rippled or faceted surface at a corresponding viewing location, each viewing location corresponding to a viewpoint of the image, and wherein angular separation between viewpoint is configured to provide a unique viewpoint to each eye of a viewer, thus allowing viewers at the different viewing locations to perceive a different image depending on the viewing location and to perceive different images with a continuous transition when moving from one viewing location to another and further allowing a binocular 3D effect.

According to a further embodiment of the present disclosure, a method to capture and display video information as three-dimensional (3D) images at multiple viewing locations is provided, comprising: providing an array of cameras to capture images of a scene from multiple perspectives, each camera corresponding to a viewing location; and capturing the images from at least one specular reflector having a rippled or faceted surface, wherein adjacent pixels of the reflected images are reflected at different angles to the viewing locations depending on the angle of the rippled or faceted surface at a corresponding viewing location, wherein orientation of the array of cameras with respect to the scene corresponds to orientation of the viewing location with respect to the at least one specular reflector.

According to yet another embodiment of the present disclosure, a method to capture and display video information as three-dimensional (3D) images at multiple viewing locations using motion parallax is provided, comprising: providing one or more cameras; providing at least one concave specular reflector having a rippled or faceted surface; capturing images of a scene reflected on the at least one specular reflector with the one or more cameras, the one or more cameras being pointed towards the at least one or more specular reflector; and projecting the captured images onto a same or similar specular reflector, wherein adjacent pixels of the reflected images are reflected at different angles to the viewing locations depending on the angle of the rippled or faceted surface at a corresponding viewing location.

Further embodiment of the present disclosure are provided in the specification, figures and claims of the present application.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF EXAMPLE EMBODIMENTS

The following description and drawings are illustrative of the disclosure and are not to be construed as limiting the disclosure. Numerous specific details are described to provide a thorough understanding of the disclosure. However, in certain instances, well known or conventional details are not described in order to avoid obscuring the description of the disclosure. References to one or an embodiment in the present disclosure are not necessarily references to the same embodiment; and, such references mean at least one.

Reference will be initially made to horizontal 3D motion parallax. This could be the case for a controlled home theater environment, where the viewer is seated and more likely to move from side to side than up and down.

Figure 1:
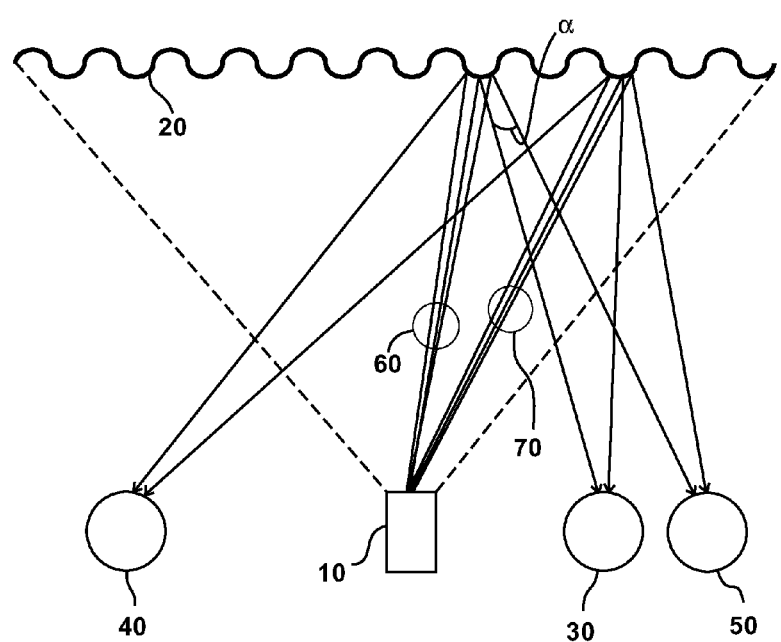
FIG. 1 shows a front projector projecting light onto a rippled surface according to an embodiment of the disclosure.

FIG. 1 shows a front projector (10) projecting light onto a rippled surface or reflector (20) according to an embodiment of the present disclosure. The surface (20) is a specular component that can have a high specular reflectivity, such as a mirrored surface. The specular component ensures that the reflected light is directed towards a desired viewpoint. The specular component has diffusion in a non-parallax direction (e.g., vertical diffusion for horizontal parallax). This ensures (in the case of horizontal parallax) that viewers can still see the same image if they move up and down. Methods to implement single-axis diffusion are known in the art and will not be discussed here in detail. See, for example, U.S. Pat. No. 7,453,637 to Taira, U.S. Pat. No. 6,795,241 to Holzbach and U.S. Pat. No. 6,437,917 to Ooshima, all of which are incorporated herein by reference in their entirety. A further method is to use a commercially available asymmetric diffusion sheet (e.g., a Luminit™ sheet), which diffuses primarily along a single axis.

Three different viewing locations (30), (40) and (50) are shown in the figure. Due to the shape of the surface (20), adjacent pixels of the projected image (60) or (70) are reflected at different angles, depending on the angle of the rippled surface (20) at the corresponding locations. In this manner, viewers at different viewing locations (30), (40) and (50) perceive different vertical columns of pixels and hence a different image depending on their location. Additionally, when the viewer moves from side to side, different images will be perceived. Therefore, motion parallax will occur.

Figure 5:
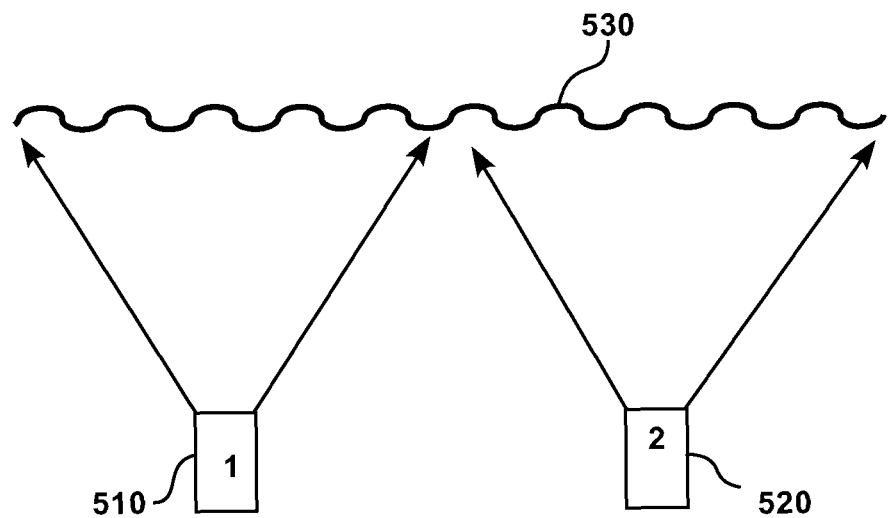
FIG. 5 shows multiple projectors projecting light onto a screen having a rippled surface according to an embodiment of the disclosure.

According to some embodiments of the present disclosure, the horizontal resolution of the projector (10) (i.e. the total number of vertical columns of pixels) is dependent on the number of desired viewing locations. For example, if a number of 10 to 1000 different viewpoints (i.e. unique perspectives of the image) is desired, then the horizontal resolution of the projector (10) should be 10 to 1000 times the horizontal resolution of what would otherwise be desirable. A possible method for obtaining such increased horizontal resolution is that of tiling multiple projectors. Reference can also be made to FIG. 5 of the present application, which will be discussed later.

Calibration and interlacing of the 3D image will allow a viewer to be shown the 3D image and navigate around it. In particular, calibration and interlacing involves modeling or experimentally determining the mapping between a vertical pixel column (e.g., column c10) coming out of projector (10) and the corresponding image viewing location where that column is desired to appear (e.g., viewing location (30)). Therefore, the 3D image can be calibrated so that, for example, vertical pixel columns c10, c50, c110, c150, c210, and c250 are all visible at viewing location (30). Each of these columns will reflect an adjacent facet of surface or reflector (20), thus comprising an image. On the other hand, vertical pixel column c15 could, for example, appear at viewing location (50), making it an adjacent viewpoint. Once the 3D image has been calibrated (i.e. the above pixel column→viewing location relationship has been modeled and/or measured), the 3D image will be interlaced, i.e. the projector image will be created in a manner that the desired image at each of the viewing locations is achieved. Calibration and interlacing techniques per se could be developed by persons skilled in the art through lookup tables (LUT) or algorithmically from source images. Therefore, they will not be discussed in detail in the present application. By way of example, the calibration could be measured by displaying a single vertical line, and rotating an optical measurement device through the viewing range until the vertical line is detected. The position of the optical measurement device would indicate the corresponding viewing position. Alternatively, instead of rotating a single measurement device, an array of measurement devices can be arranged around the viewing range.

The horizontal resolution of the projector (10) determines the combination of simultaneous views and horizontal resolution for each viewpoint. For example, if the projector (10) has a horizontal resolution of 100,000 vertical columns, and 100 views are desired, it means that each viewpoint will have an equivalent image resolution of 1000 vertical columns. This assumes each image has the same resolution. In an alternative embodiment, a horizontal resolution of at least one view can be greater than other views by utilizing a higher proportion of vertical columns. For example, "on axis" viewpoints can have a much higher density than "peripheral" viewpoints.

Angular separation of the viewing locations (30), (40), (50) can also be a factor to be considered. In particular, for smooth transition between viewpoints a very small angular separation between views may be required. Moreover, the larger the viewing distance of the viewing locations from the screen, the closer the distance between the viewpoints to achieve such smooth transition. Generally speaking, the angular separation of the viewpoints can be calculated by dividing the viewing angle of the system by the number of viewpoints, assuming uniform separation is desirable. For example, if there are 100 viewpoints, and each has to be 1 degree apart for smooth transition at a particular viewing distance, then the total viewing angle of the system has to be dimensioned to be 100 degrees wide. If a smaller viewing angle is acceptable (such as in a theatre, for example), then the viewpoints can be more tightly spaced, or the number of viewpoints can be decreased. With reference to the diagram of FIG. 1, viewing locations (30) and (50) can be considered viewing locations corresponding to adjacent viewpoints. Angle α shown in FIG. 1 represents the angular separation between viewpoints (30) and (50).

In accordance with several embodiments of the present disclosure, each viewing location corresponds to a viewpoint of the image. In other words, each viewpoint of a system of (n) unique viewpoints can be perceived only from a single angular position from the normal of the display surface, such that at no viewing position is there an "inversion" or "wraparound" effect whereby, e.g., viewpoint (n+1) is identical to viewpoint (1) and hence there is a discontinuity between viewpoints (n) and (n+1).

Figure 2:
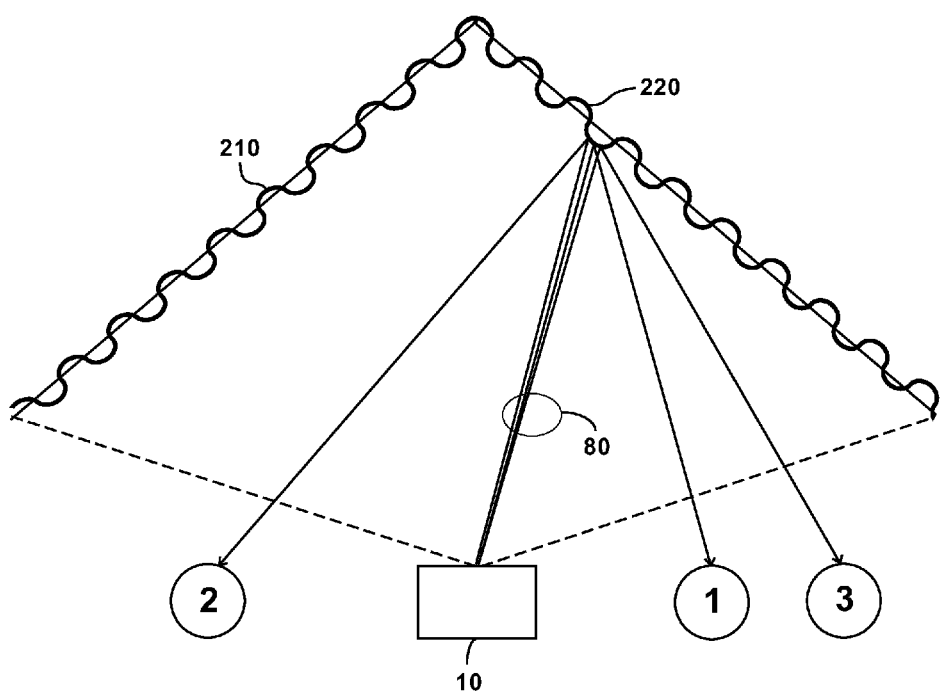
FIG. 2 shows an embodiment where two or more projection screens are used, arranged at an angle according to an embodiment of the disclosure.

Additionally, in accordance with embodiments of the present disclosure, each viewpoint is separated by an angular separation sufficiently small to provide a unique viewpoint to each eye, thus causing binocular 3D effect, in addition to the motion parallax effect. Such angular separation will depend on designed viewing distance and angular viewing range FIG. 2 shows an embodiment similar to the one of FIG. 1; a difference being that two or more projection screens (210), (220) are used, arranged at an angle. In this way, the effective size of an object to be displayed can be increased. An additional effect is that the possible depth of an object is increased. For example, with a flat screen, an object can appear only as close as allowed within the borders of the screen. On the other hand, with an angled screen the image can be projected into a greater 3D volume in front of the viewer, thus allowing a more immersive experience. It should be understood that, based upon the teachings contain herein, adjustment of the projector image (80) to compensate for projection distortion effects can be implemented by conventional software compensation techniques. Projection distortion effects can include, for example, keystone effects (e.g., a skewed output image due to, in this example, projection onto a surface at an angle), barrel distortion, flat field distortion, and color correction.

Figure 3:
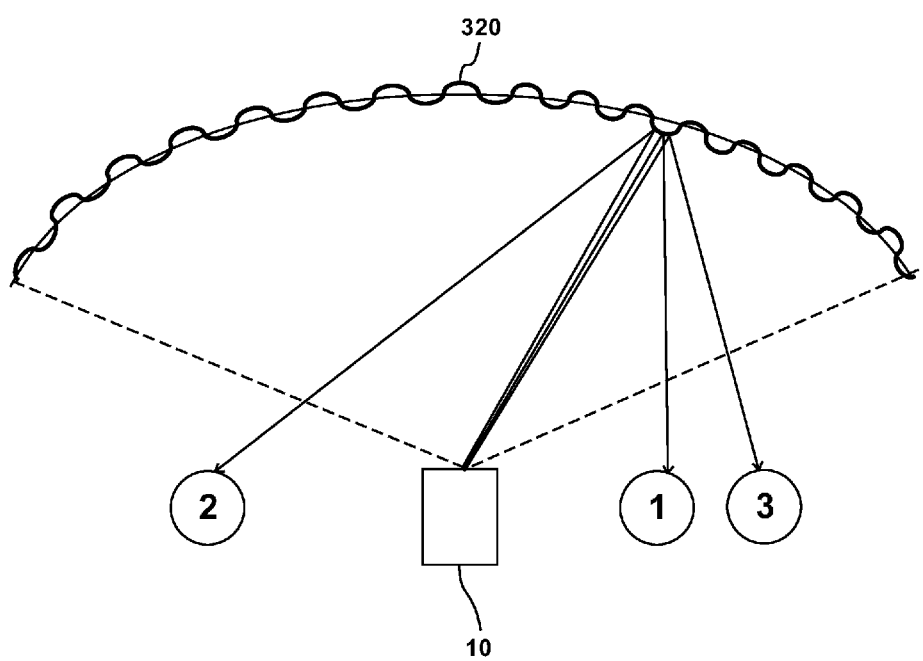
FIG. 3 shows a front projector projecting light onto a concave projection screen according to an embodiment of the disclosure.

FIG. 3 shows an alternative embodiment where a concave curved projection screen (320) is used. This embodiment has many of the advantages of the embodiment of FIG. 2, without its drawbacks. In particular, the screen (320) wraps around the viewer as in the embodiment of FIG. 2, providing more immersion, as there is a greater region of volume where a 3D object can be projected into. However, while angled screens have a visible seam (discontinuity) where they join in the center, as the reflections from this area will be different than elsewhere, such discontinuity is not present in the embodiment of FIG. 3. Therefore, a more consistent image surface is provided to the user.

Figure 4:
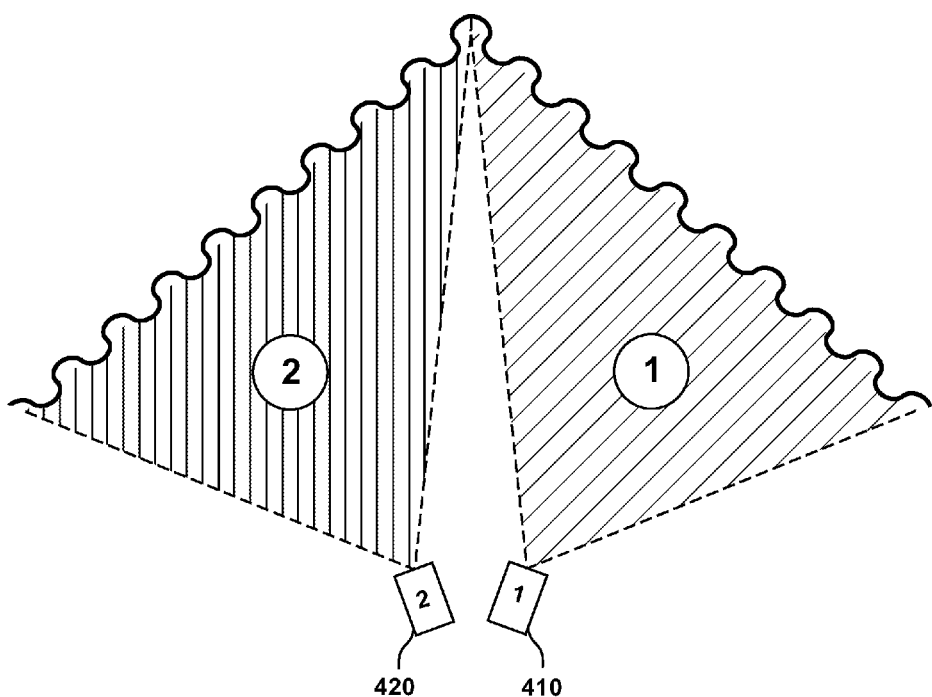
FIG. 4 shows multiple projectors projecting light onto two screens having a rippled surface according to an embodiment of the disclosure.

FIG. 4 shows an embodiment with multiple projectors. In particular, two projectors (410), (420) are shown. Multiple projectors are used for increased spatial resolution, as already noted with reference to FIG. 1. In particular, to provide, for example, 100 viewpoints each with an image having a resolution of 1000 vertical pixel columns, a projector should have a resolution of 100,000 vertical columns or greater. Instead, it is possible to tile two projectors each with a resolution of 50,000 vertical columns or greater. Depending on the various applications, such projectors can be tiled or not. For example, they can be tiled in the embodiments of FIGS. 1 and 3. See also FIG. 5 where two projectors (510), (520) are shown, each covering a partial section of reflector (530). On the other hand, with reference to the embodiment of FIG. 2, one projector per screen can be used, as shown in FIG. 4. If desired, the embodiment of FIG. 4 can also provide for multiple projectors tiled onto at least one of the reflectors. In addition to tiling projectors side-by-side, projectors can also be tiled in an overlaid manner, whereby the image of a first projector is overlaid by the image for a second projector, but displaced slightly such that the pixels from the second projector fall in between pixels from the first projector.

Figure 6:
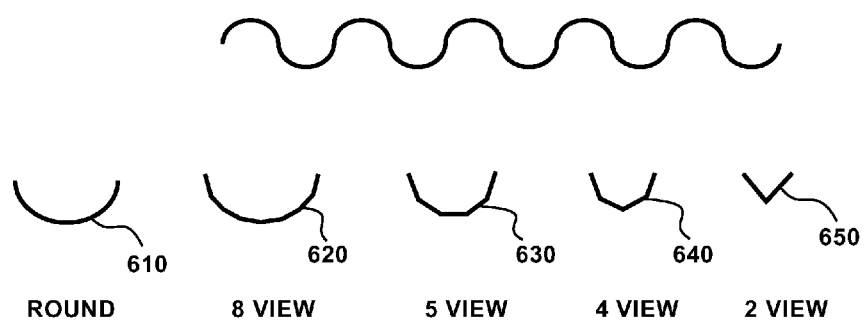
FIG. 6 shows faceted components of a rippled surface according to an embodiment of the disclosure.

The embodiments of FIGS. 1-5 show a rippled surface. Such surface can be obtained, for example, through the presence of round components. However, alternative embodiments can be provided, where the components are faceted, and the number of facets corresponds to the desired number of views. FIG. 6 shows, in addition to a round component (610), by way of example, an eight-faceted component (620), a five-faceted component (630), a four-faceted component (640), and a two-faceted component (650). As also explained below in greater detail, the number of facets should correspond to the number of viewpoints.

According to embodiments of the present disclosure, applicable both to the rippled and faceted embodiments, 10 to 1000 viewpoints can be used, in order to provide a smooth transition between adjacent viewpoints. The exact number of viewpoints will depend on the designed viewing distance and the angular viewing range. Additionally, also the angular density between viewpoints should be taken into account, again corresponding to the designed viewing distance and the angular viewing range. A range suitable for the teachings of the present disclosure is an angular density range between 0.1 and 1 degrees.

A faceted configuration of the various components may improve image quality when compared to a round configuration, as a single pixel would not be "stretched" across multiple view angles, but would instead be reflected towards only a single viewing location.

In order to avoid seams or non-uniformity, embodiments of the present disclosure provide a sufficiently high resolution of the facets, as also mentioned above, in order to avoid blank spots between viewpoints, corresponding to "dead" areas of the reflecting screen. In particular, each reflector should be large enough to encompass the number of desired vertical pixel columns. For example, in case of 100 desired viewpoints, each reflector ripple should have a circumference of approximately 100 pixels. In particular, in such embodiments, the facet resolution is tied with the angular resolution of the viewing locations required for smooth transition between viewpoints, also depending on the viewing distance. If, as in a prior example, a 1 degree angular separation between viewing locations is deemed sufficient, and 100 viewpoints are used, then each ripple of the screen can have 100 facets, each with a 0.5 degree angle from the previous facet, since the reflected angular separation will be twice the difference of the incident angular separation.

Figure 7:
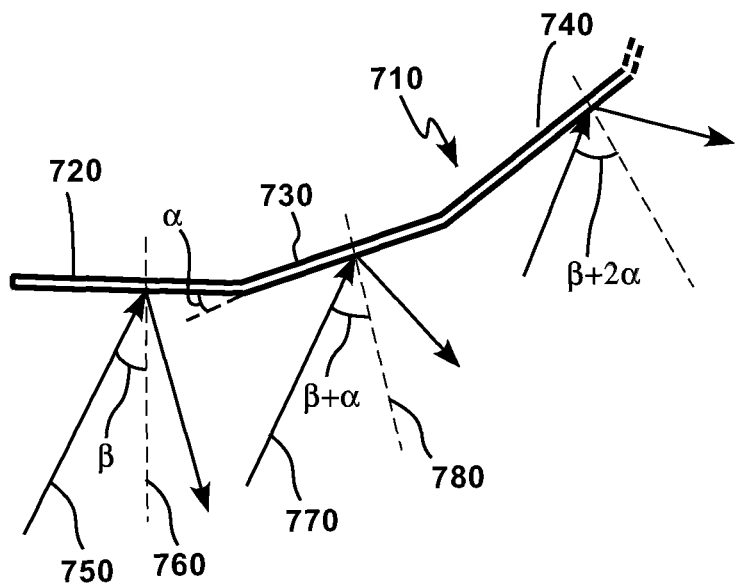
FIG. 7 shows a relationship between the angular disposition of facets and the reflected light angular separation with respect to the facets according to an embodiment of the disclosure.

FIG. 7 shows an example of such embodiment, where a faceted component (710) comprises a plurality of facets (720), (730), (740), etc at an angle a between each other. If incident light (750) comes at an angle β with respect to the normal (760) to facet (720), then incident light (770) will come at an angle α+β with respect to the normal (780) to facet (730). Therefore, while the reflected angular separation with respect to facet (720) will be 2β, the reflected angular separation with respect to facet (730) will be 2β+2α, the reflected angular separation with respect to facet (740) will be 2β+4α, and so on.

Figure 8:
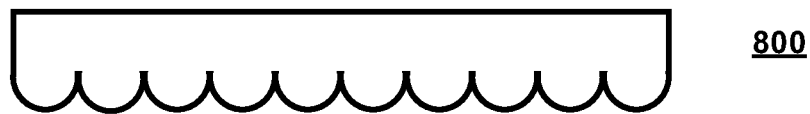
FIG. 8 shows a screen with fish scale ripples according to an embodiment of the disclosure.
Figure 9:
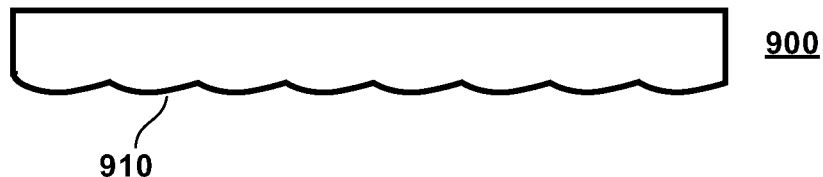
FIG. 9 shows a screen with non-symmetric facets or ripples according to an embodiment of the disclosure.

FIG. 8 shows a further embodiment of the present disclosure, where a fish scale shaped screen (800) is shown. The "fish scales" of FIG. 8 are symmetrically shaped. On the other hand, the embodiment of FIG. 9 shows non-symmetric facets or ripples (910) provided on a screen (900). Such configuration is especially useful to reduce the presence of "dead areas", i.e. areas not returning reflected light within the viewing range, as shown, for example, in FIG. 10.

Figure 10:
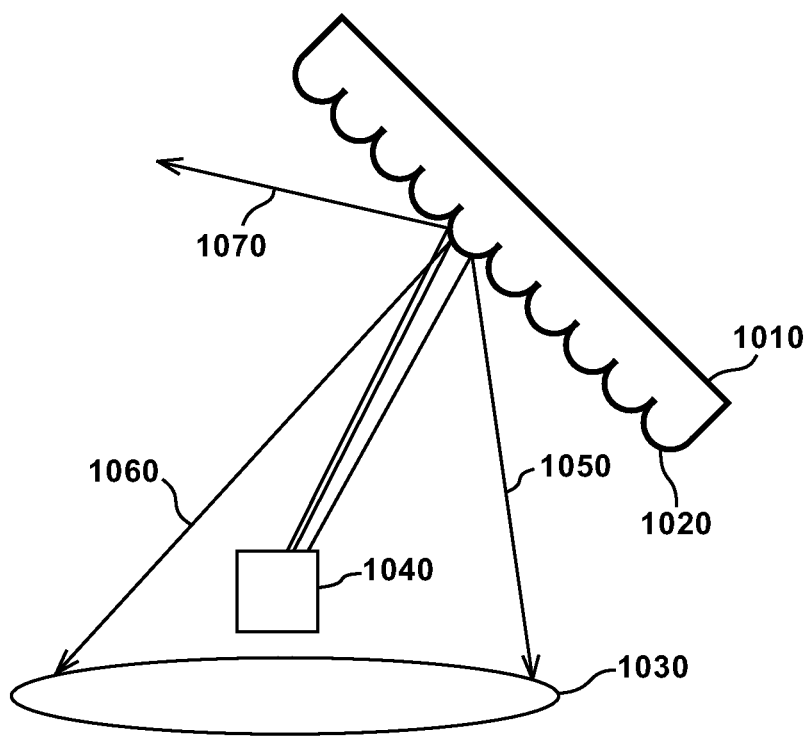
FIG. 10 shows a screen with fish scale ripples and dead areas according to an embodiment of the disclosure.

In particular, FIG. 10 shows a rippled screen (1010) having symmetrically shaped fish scales (1020), a viewing range (1030) and a projector (1040). Fish scale areas reflecting rays (1050) and (1060) are useful areas, because they fall within the viewing range (1030). On the other hand, fish scale areas reflecting rays like ray (1070) are dead areas, because ray (1070) does not fall within the viewing range (1030).

Figure 11:
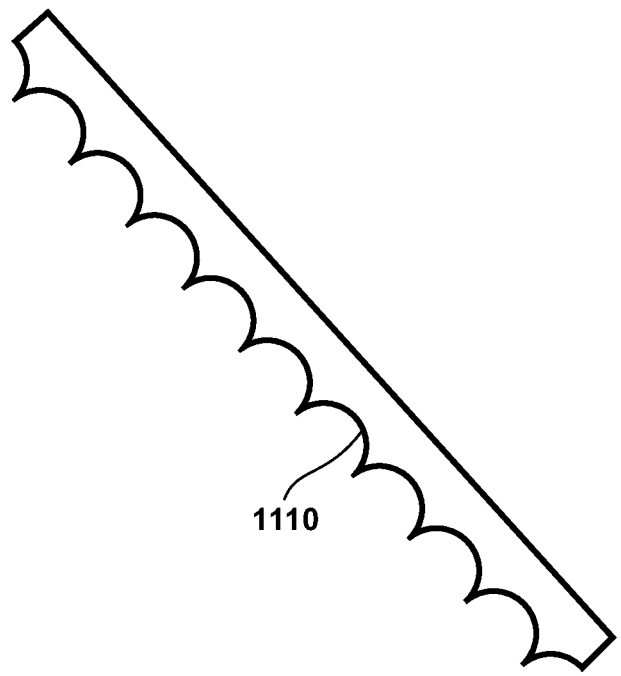
FIG. 11 shows a screen with inverted round bits according to an embodiment of the disclosure.

The embodiment of FIG. 9 allows the light to be reflected back into the desired viewing range of the system, i.e. the range of positions where the viewer can see the image with less dead space than the symmetric rippled surface. This is usually dependent on the relationships between the position of the projector, the angles of the screens, and the allowable positions of the viewers. In a particular configuration of the present disclosure, the design of the reflector structure can be optimized so that all light is only reflected to a range of desired positions. This kind of optimization can provide a benefit of not having "dead" areas of the screen where the projector is unable to reflect light towards a desired viewing location. While a fish scale shape represents one way to obtain such benefit, other shapes, both faceted and non-faceted, can be provided. For an example of faceted shapes, reference can be made to FIG. 11, where inverted round bit shapes (1110) are shown. In alternative embodiments, a screen surface can be comprised of a plurality of geometric structures, such as (without limitation) a polygon, equilateral polygon, crescent, pyramid, truncated pyramid, trapezoid, annulus, ellipse, superellipse or the like. In fact, geometric structures within a screen can differ amongst themselves. That is to say, a screen can comprise both fish scale shapes (1020), as well as inverted round bit shapes (1110).

Figure 12:
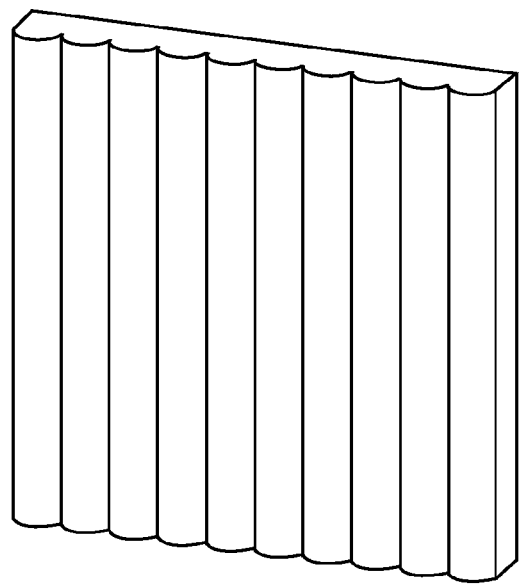
FIG. 12 shows a simplified example of rippled screen for horizontal motion parallax.
Figure 13:
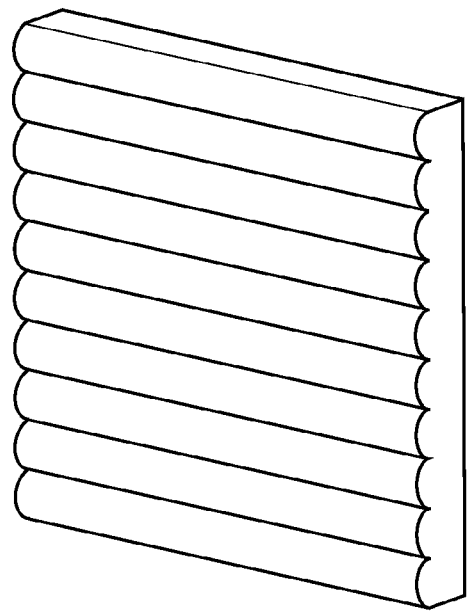
FIG. 13 shows a simplified example of rippled screen for vertical motion parallax.
Figure 14:
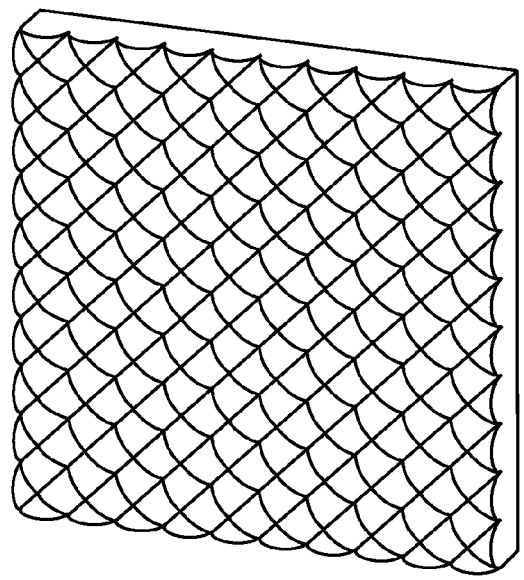
FIGS. 14-16 show simplified examples of rippled screens for combined motion parallax.
Figure 15:
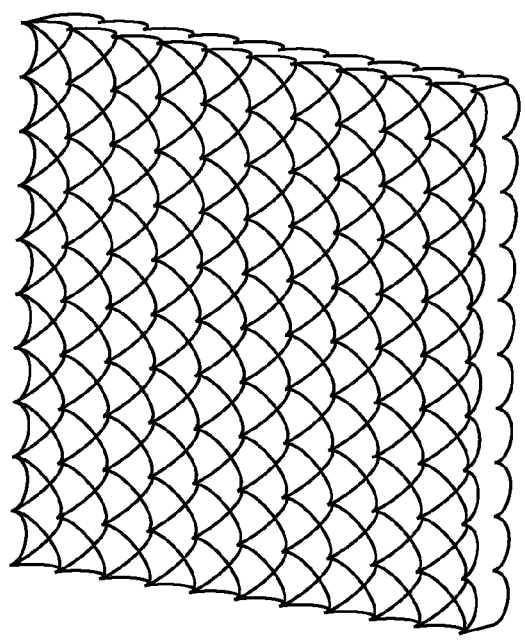
Figure 16:
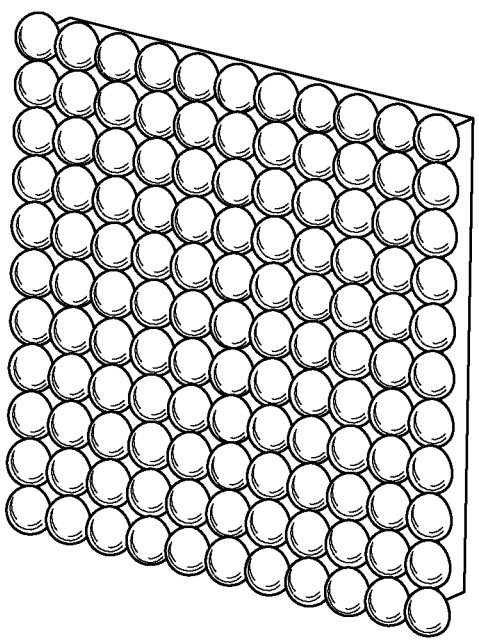

The embodiments of FIGS. 1-11 above describe horizontal motion parallax. However, the teachings of the present disclosure should be considered agnostic to the implementation of horizontal, vertical or combined (both horizontal and vertical) motion parallax. The combination of horizontal and vertical parallax can be achieved by modifying the rippled reflective surface such that it is rippled simultaneously along two dimensions. FIG. 12 shows a perspective view of a rippled screen suitable for horizontal motion parallax. FIG. 13 shows a perspective view of a rippled screen suitable for vertical motion parallax. FIGS. 14-16 show three embodiments of rippled screens suitable for combined horizontal and vertical motion parallax, where FIG. 15 shows a screen having an inverted configuration with respect to the screen of FIG. 14. It should also be noted that the embodiment of FIG. 14 has fewer sharp points (i.e. fewer discontinuities) than the embodiment of FIG. 15 and that both FIG. 14 and FIG. 15 achieve higher density than FIG. 16, which has dead areas and seams between "bubbles." The corresponding calibration, capture and interlacing concepts mentioned in the present description also apply to the vertical and combined motion parallax.

A further embodiment of the present disclosure relates to both capture and display of multiple viewpoints. In particular, in order to display multiple viewpoints like viewpoints (30), (40) and (50) of FIG. 1, the required information should first be captured or created. Of course, the amount of information required increases with the number of desired viewpoints and can be treated, if desired, with image compression techniques.

According to a first embodiment, an array of cameras is provided, to capture the subject or scene from different perspectives. Arrays of cameras are known per se and allow to create a panning motion that is faster or smoother than what could be achieved from physically moving a single camera. In this manner, the image from a particular camera is used for a small number of frames, and then the next camera, and the next, for the entire scene.

Figure 17:
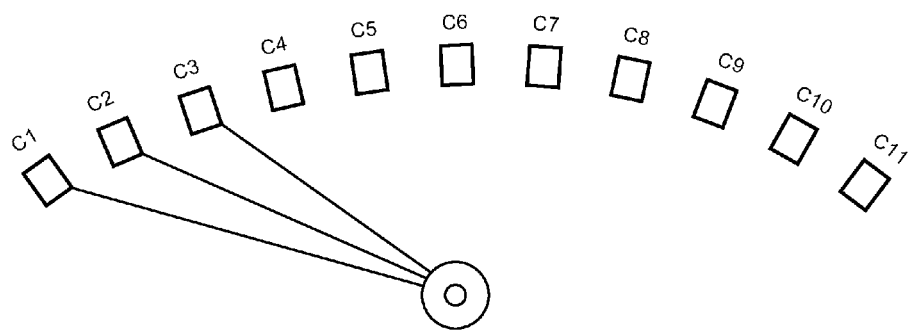
FIG. 17 shows an array of cameras capturing a subject from different perspectives to an embodiment of the disclosure.

Reference can be made, for example, to the embodiment of FIG. 17, where a plurality of cameras (camera array) C1 . . . C11 captures an object O on stage. The cameras C1 . . . C11 are orientated at a virtual "stage" in an inverse relationship to the viewpoints of the corresponding screen. For multi-view embodiments, instead of choosing a single camera at a time, the views from all cameras are simultaneously captured and transmitted to the display.

For optimal performance, the display can be calibrated for the viewpoints to correspond to camera positions. In particular, mapping functions will correlate the capture environment (distances, number of viewpoints, angular separations of viewpoints) to the display environment. Alternatively, viewpoints can be subsampled from the camera array by interpolating between capture positions. These viewpoints can also be subsampled by the display, with the advantage of requiring a lower transmission bandwidth. Interpolation techniques between two similar images are known as such to the person skilled in the art and will not be discussed in detail. These techniques are commonly applied for frame rate conversion, where one or more intermediate frames are interpolated between two or more reference frames. These techniques aim to preserve edges and local detail while allowing for expected differences between the images due to movement. For multiview, similar techniques can be employed, interpolating viewpoints (virtual cameras) between reference viewpoints (cameras).

Figure 18:
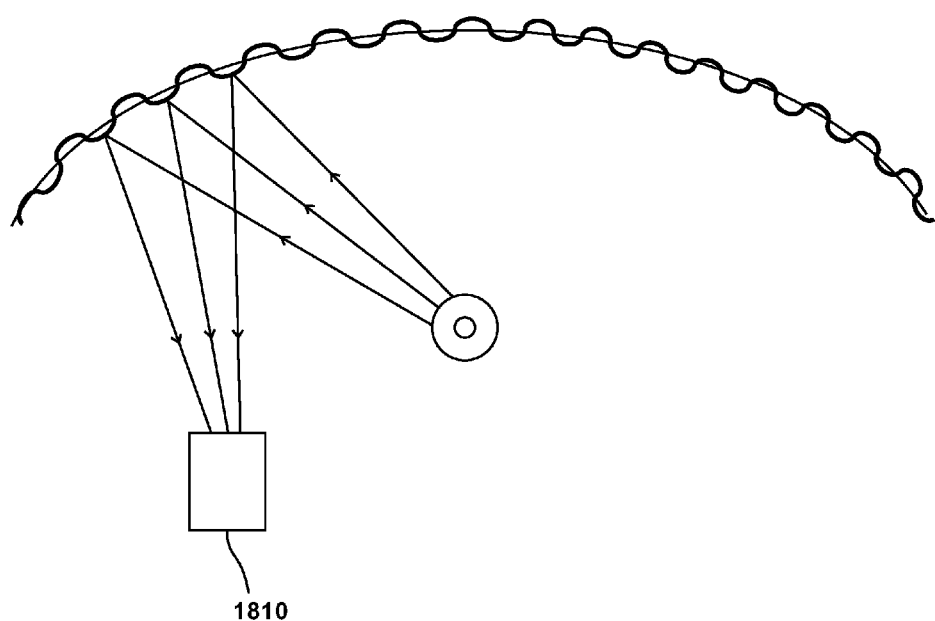
FIG. 18 shows a single camera used in combination with a concave rippled reflecting lens according to an embodiment of the disclosure.

FIG. 18 shows a further embodiment of the disclosure where, differently from the embodiment of FIG. 17, instead of using an array of cameras positioned at various viewpoints, a single camera (1810) is used with a large rippled reflecting lens (specular) (1820). While the embodiment of FIG. 18 shows a concave rippled lens (1820), such rippled lens can also have other shapes, such as flat, etc. According to an embodiment of the present disclosure, the lens (1820) is similar to the specular reflecting screen previously described in the present application, see, for example, FIG. 3. The arrangement of FIG. 18 can simultaneously capture multiple viewpoints limited only by the resolution of the camera sensor. By way of example, a film studio could be outfitted with a single large rippled concave lens (e.g., a reflective screen) with a single very high resolution camera to simultaneously capture a scene from many viewpoints. The camera then captures an interlaced signal as would be suitable for a projector with the same corresponding physical arrangement. Multiple cameras can be tiled in the same manner as the projectors are tiled. Replacing the camera with the projector will re-create the scene. Modifications between the screen at the capture and display, the projector resolution, and the desired viewing range or number of viewpoints are managed through mapping techniques.

In the embodiment of FIG. 18, the rippled reflector can be suitable both for capture and projection. For example, capture and projection could be time-alternated to provide a bidirectional 3D communications interface suitable for teleconferencing.

The examples set forth above are provided to give those of ordinary skill in the art a complete disclosure and description of how to make and use the embodiments of the 3D capture and/or display systems and methods of the disclosure, and are not intended to limit the scope of what the inventors regard as their disclosure. Modifications of the above-described modes for carrying out the disclosure may be used by persons of skill in the video art, and are intended to be within the scope of the following claims.

For example, while embodiments and drawings of the present disclosure have been provided with reference to front projection, the teachings of the present disclosure also apply to rear projection in combination with a transmissive screen.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Accordingly, the invention may be embodied in any of the forms described herein, including, but not limited to the following Enumerated Example Embodiments (EEEs) which describe structure, features, and functionality of some portions of the present invention:

EEE1. A system for three-dimensional (3D) display of images using motion parallax, comprising:
at least one specular reflector having a rippled or faceted surface;
at least one projector adapted to project images onto the rippled or faceted surface of the at least one specular reflector; and
a plurality of viewing locations, each viewing location adapted to perceive images projected from the at least one projector and reflected by the rippled or faceted surface of the at least one specular reflector,
wherein:
the images perceived by the viewing locations differ in accordance with an angle formed by the rippled or faceted surface when reflecting an image to a viewing location,
each viewing location corresponds to a viewpoint of the image, and
the number of the viewpoints of the image and the angular density of the viewpoints of the image are configured to provide a smooth transition between adjacent viewpoints of the image.

EEE2. The system of EEE 1, wherein the number of the viewpoints of the image is from 10 to 1000 and the angular density of the viewpoints of the image is between 0.1 and 1 degrees.

EEE3. The system of EEE 1, wherein the at least one projector has a resolution depending in part on the number of the viewing locations.

EEE4. The system of EEE 1, wherein the viewpoint resolution is selected between desired horizontal, vertical, and combined horizontal-vertical viewpoint resolution.

EEE5. The system of EEE 1, wherein the at least one projector is a plurality of projectors.

EEE6. The system of EEE 5, wherein the plurality of projectors is a plurality of side-by-side or tiled projectors.

EEE7. The system of EEE 1, wherein the images projected by the at least one projector are calibrated and interlaced images.

EEE8. The system of EEE 1, wherein the viewing locations are angularly separated from each other with respect to the at least one specular reflector, the angular separation between the viewing locations being determined by dividing a viewing angle of the system by the number of viewing locations.

EEE9. The system of EEE 1, wherein the at least one specular reflector are two or more specular reflectors arranged at an angle with respect to each other.

EEE10. The system of EEE 9, wherein the at least one projector are two or more projectors, each projecting on a corresponding specular reflector.

EEE11. The system of EEE 9, wherein multiple projectors are tiled onto at least one of the two or more specular reflectors.

EEE12. The system of EEE 1, wherein the images projected by the at least one projector are images compensated for projection distortion effects.

EEE13. The system of EEE 1, wherein the at least one specular reflector is a concave specular reflector.

EEE14. The system of EEE 1, wherein the rippled or faceted surface is a surface having a plurality of faceted components, each facet of the faceted components corresponding to a desired view of the image.

EEE15. The system of EEE 14, wherein the number of facets of each faceted component depends on the desired number of viewpoints of the system.

EEE16. The system of EEE 1, wherein the rippled or faceted surface is a surface with fish scale ripples.

EEE17. The system of EEE 16, wherein the fish scale ripples are non-symmetrically shaped fish scale ripples.

EEE18. The system of EEE 1, wherein the rippled or faceted surface is a surface with inverted round bit shaped ripples.

EEE19. The system of EEE 1, wherein the rippled or faceted surface is a surface comprising horizontally oriented ripples or facets for horizontal motion parallax.

EEE20. The system of EEE 1, wherein the rippled or faceted surface is a surface comprising vertically oriented ripples or facets for vertically motion parallax.

EEE21. The system of EEE 1, wherein the rippled or faceted surface is a surface comprising horizontally and vertically oriented ripples or facets for a combined horizontal and vertical motion parallax.

EEE22. The system of EEE 1, wherein the rippled or faceted surface has diffusion in a non-parallax direction.

EEE23. The system of EEE 1, wherein the at least one projector is at least one front projector or at least one rear projector, and the screen is either reflective or transmissive, respectively.

EEE24. A method for displaying three-dimensional (3D) images using motion parallax, comprising:
projecting images onto a rippled or faceted surface of at least one specular reflector, wherein adjacent pixels of the reflected images are reflected at different angles to different viewing locations depending on the angle of the rippled or faceted surface at a corresponding viewing location, each viewing location corresponding to a viewpoint of the image, and wherein angular separation between viewpoint is configured to provide a unique viewpoint to each eye of a viewer, thus allowing viewers at the different viewing locations to perceive a different image depending on the viewing location and to perceive different images with a continuous transition when moving from one viewing location to another and further allowing a binocular 3D effect.

EEE25. The method of EEE 24, wherein projecting the images onto the rippled or faceted surface comprises projecting the images with a viewpoint resolution depending in part on the number of the viewing locations.

EEE26. The method of EEE 24, wherein projecting the images onto the rippled or faceted surface comprises projecting the image with a projecting resolution selected between horizontal viewpoint resolution, vertical viewpoint resolution and combined horizontal and vertical viewpoint resolution, and desired 3D image resolution.

EEE27. The method of EEE 26, wherein the viewpoint resolution is selected independently for the viewing locations.

EEE28. The method of EEE 24, wherein projecting the images onto the rippled or faceted surface comprises projecting the image with a plurality of projectors.

EEE29. The method of EEE 28, wherein the plurality of projectors is a plurality of side-by-side tiled projectors.

EEE30. The method of EEE 28, wherein the at least one specular reflector comprises a plurality of specular reflector, each projector of the plurality of projectors corresponding to a specular reflector of the plurality of specular reflectors.

EEE31. The method of EEE 24, wherein projecting the images onto the rippled or faceted surface comprises projecting calibrated and interlaced images.

EEE32. The method of EEE 24, wherein the viewing locations are angularly separated from each other with respect to the at least one specular reflector, the angular separation between the viewing locations being determined by dividing a viewing angle of the system by the number of viewing locations.

EEE33. The method of EEE 24, wherein the at least one specular reflector are two or more specular reflectors arranged at an angle with respect to each other.

EEE34. The method of EEE 24, wherein the at least one specular reflector is a concave specular reflector.

EEE35. The method of EEE 24, wherein the rippled or faceted surface is a surface having a plurality of faceted components, each facet of the faceted components corresponding to a desired view of the image.

EEE36. The method of EEE 35, wherein the number of facets of each faceted component depends on angular separation between the viewing locations.

EEE37. The method of EEE 24, wherein the rippled or faceted surface is a surface with fish scale ripples.

EEE38. The method of EEE 37, wherein the fish scale ripples are non-symmetrically shaped fish scale ripples.

EEE39. The method of EEE 24, wherein the rippled or faceted surface is a surface with inverted round bit shaped ripples.

EEE40. The method of EEE 24, wherein the rippled or faceted surface is a surface comprising horizontally oriented ripples or facets for horizontal motion parallax.

EEE41. The method of EEE 24, wherein the rippled or faceted surface is a surface comprising vertically oriented ripples or facets for vertically motion parallax.

EEE42. The method of EEE 24, wherein the rippled or faceted surface is a surface comprising horizontally and vertically oriented ripples or facets for a combined horizontal and vertical motion parallax.

EEE43. The method of EEE 24, wherein projecting is front projecting or rear projecting.

EEE44. A method to capture and display video information as three-dimensional (3D) images at multiple viewing locations, comprising:
providing an array of cameras to capture images of a scene from multiple perspectives, each camera corresponding to a viewing location; and
capturing the images from at least one specular reflector having a rippled or faceted surface, wherein adjacent pixels of the reflected images are reflected at different angles to the viewing locations depending on the angle of the rippled or faceted surface at a corresponding viewing location,
wherein orientation of the array of cameras with respect to the scene corresponds to orientation of the viewing location with respect to the at least one specular reflector.

EEE45. The method of EEE 44, wherein the at least one specular reflector comprises a rippled or faceted surface.

EEE46. The method of EEE 44, wherein projecting is front projecting or rear projecting.

EEE47. A method to capture and display video information as three-dimensional (3D) images at multiple viewing locations using motion parallax, comprising:
providing one or more cameras;
providing at least one concave specular reflector having a rippled or faceted surface;
capturing images of a scene reflected on the at least one specular reflector with the one or more cameras, the one or more cameras being pointed towards the at least one or more specular reflector; and
projecting the captured images onto a same or similar specular reflector, wherein adjacent pixels of the reflected images are reflected at different angles to the viewing locations depending on the angle of the rippled or faceted surface at a corresponding viewing location.

EEE48. The method of EEE 47, wherein projecting is front projecting or rear projecting. Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

The invention claimed is:

1. A system for three-dimensional (3D) display of images using motion parallax, comprising:
    at least one specular reflector having a faceted surface having a plurality of faceted components, each facet of the faceted components corresponding to a desired viewpoint of the image; and
    at least one projector adapted to project interlaced images onto the faceted surface of the at least one specular reflector, wherein:
    the images are projected in a plurality of directions which differ in accordance with an angle formed by the faceted surface when reflecting an image to a viewing location,
    each viewing location corresponds to a viewpoint of the image, and
    the number of the view points of the image is from 10 to 1000 and the angular density of the view points of the image is between 0.1 and 1 degrees.

2. The system of claim 1, wherein the number of the viewpoints of the image and the angular density of the viewpoints of the image are configured to provide a smooth transition between adjacent viewpoints of the image.

3. The system of claim 1, wherein the plurality of faceted components are arranged at an angle a between each other, so that light coming from the at least one projector is incident at an angle $\beta$ with respect to the normal of a first facet and incident at an angle $\alpha+\beta$ with respect to the normal of a second facet.

4. The system of claim 1, wherein the at least one projector has a resolution depending in part on the number of the viewing locations.

5. The system of claim 1, wherein the viewpoint resolution is selected between desired horizontal, vertical, and combined horizontal-vertical viewpoint resolution.

6. The system of claim 1, wherein the at least one projector is a plurality of projectors.

7. The system of claim 6, wherein the plurality of projectors is a plurality of side-by-side or tiled projectors.

8. The system of claim 1, wherein the images projected by the at least one projector are calibrated images.

9. The system of claim 1, wherein the viewing locations are angularly separated from each other with respect to the at least one specular reflector, the angular separation between the viewing locations being determined by dividing a viewing angle of the system by the number of viewing locations.

10. The system of claim 1, wherein the at least one specular reflector are two or more specular reflectors arranged at an angle with respect to each other.

11. The system of claim 10, wherein the at least one projector are two or more projectors, each projecting on a corresponding specular reflector.

12. The system of claim 10, wherein multiple projectors are tiled onto at least one of the two or more specular reflectors.

13. The system of claim 1, wherein the images projected by the at least one projector are images compensated for projection distortion effects.

14. The system of claim 1, wherein the at least one specular reflector is a concave specular reflector.

15. The system of claim 1, wherein the number of facets of each faceted component depends on the desired number of viewpoints of the system.

16. The system of claim 1, wherein the number of facets of each faceted component corresponds to the desired number of viewpoints of the system.

17. The system of claim 1, wherein the faceted surface is a surface comprising horizontally oriented facets for horizontal motion parallax.

18. The system of claim 1, wherein the faceted surface is a surface comprising vertically oriented facets for vertical motion parallax.

19. The system of claim 1, wherein the faceted surface has diffusion in a non-parallax direction.

20. The system of claim 1, wherein the at least one projector is a front projector, and the screen is reflective.

21. The system of claim 1, wherein a faceted component comprises 2 to 8 facets.

22. The system of claim 1, wherein a faceted component comprises 2 facets or 4 facets or 5 facets or 8 facets.

23. A system for three-dimensional (3D) display of images using motion parallax, comprising:
    at least one specular reflector having a faceted surface having a plurality of faceted components, each facet of the faceted components corresponding to a desired viewpoint of the image; and
    at least one projector adapted to project interlaced images onto the faceted surface of the at least one specular reflector,
wherein:
    the images are projected in a plurality of directions which differ in accordance with an angle formed by the faceted surface when reflecting an image to a viewing location,
    each viewing location corresponds to a viewpoint of the image,
    the plurality of faceted components are arranged at an angle $\alpha$ between each other, so that light coming from the at least one projector is incident at an angle $\beta$ with respect to the normal of a first facet and incident at an angle $\alpha+\beta$ with respect to the normal of a second facet, and
    the reflected angular separation with respect to the first facet is $2\beta$, and the reflected angular separation with respect to the second facet is $2\beta+2\alpha$.

24. A system for three-dimensional (3D) display of images using motion parallax, comprising:
    at least one specular reflector having a faceted surface having a plurality of faceted components, each facet of the faceted components corresponding to a desired viewpoint of the image; and at least one projector adapted to project interlaced images onto the faceted surface of the at least one specular reflector, wherein:

the images are projected in a plurality of directions which differ in accordance with an angle formed by the faceted surface when reflecting an image to a viewing location, each viewing location corresponds to a viewpoint of the image, and the faceted surface is a surface comprising horizontally and vertically oriented facets for a combined horizontal and vertical motion parallax.

* * * * *